United States Patent [19]

Thompson

[11] Patent Number: 4,932,923
[45] Date of Patent: Jun. 12, 1990

[54] SEALED BEARING ARRANGEMENT FOR UNIVERSAL JOINT

[75] Inventor: David P. Thompson, Parma, Ohio

[73] Assignee: General Motors Corporation, Detroit, Mich.

[21] Appl. No.: 391,821

[22] Filed: Aug. 10, 1989

[51] Int. Cl.5 .................. F16J 15/32; F16C 33/78; F16C 3/41
[52] U.S. Cl. .................... 464/131; 277/95; 277/152; 384/484
[58] Field of Search .................... 277/38, 95, 152; 384/484, 485, 486; 464/11, 14, 128, 131

[56] References Cited

U.S. PATENT DOCUMENTS

| | | | |
|---|---|---|---|
| 3,218,692 | 11/1965 | Kayser | 464/131 X |
| 4,021,085 | 5/1977 | Willyard | 464/131 X |
| 4,377,312 | 3/1983 | Zackrisson | 464/131 X |
| 4,515,574 | 5/1985 | Mazziotti | 464/131 |
| 4,613,317 | 9/1986 | Morihiro | 464/131 |
| 4,834,691 | 5/1989 | Schultze et al. | 464/131 |

Primary Examiner—Daniel P. Stodola
Attorney, Agent, or Firm—F. J. Fodale

[57] ABSTRACT

A sealed bearing arrangement for a Cardan type universal joint comprises a bearing cup and a seal assembly which has an elastomeric body and a metal washer of U-shaped cross section. The elastomeric body has an inner flexible, annular seal lip which engages an inside cylindrical surface of the bearing cup and an outer seal bead and an outer flexible, annular seal lip which engage outside surfaces of the bearing cup. The sealed bearing arrangement includes a hardened steel washer inside the bearing cup which is engaged by an end of the metal washer of the seal assembly to protect the inner flexible, annular seal lip against damage or interference by needle bearing rollers inside the bearing cup.

8 Claims, 1 Drawing Sheet

1

SEALED BEARING ARRANGEMENT FOR UNIVERSAL JOINT

BACKGROUND OF THE INVENTION

This invention relates generally to bearing arrangements and more specifically to sealed bearing arrangements for a Cardan type universal joint or the like.

U.S. Pat. No. 3,138,942 granted to John A. Kayser June 30, 1964 discloses a known sealed bearing arrangement for a Cardan type universal joint having a seal assembly which is "c-shaped" in cross-section and which includes an annular resilient elastomeric portion which seals against interior and exterior surfaces at an open end of a bearing cup.

Sealed bearing arrangements according to the U.S. Pat. No. 3,138,942 to John A. Kayser have been used successfully for many years. However such sealed bearing arrangements have certain deficiencies such as a fixed interior seal lip which does not have the ability to seal adequately under severe operating conditions or to accommodate substantial amounts of seal wear.

SUMMARY OF THE INVENTION

The object of my invention is to provide an improved sealed bearing arrangement for a Cardan type universal joint or the like which has an improved sealing ability in comparison to sealed bearing arrangements of the type disclosed in the Kayser patent.

One feature of my invention is that the sealed bearing arrangement includes a seal assembly which has a flexible, annular sealing lip which is deflected into a self-biased sealing engagement with an inner cylindrical surface of a bearing cup so as to improve sealing ability even in severe operating conditions or after substantial seal wear.

Another feature of my invention is that the sealed bearing arrangement is constructed for protecting the flexible, annular sealing lip against damage by or operational interference from needle bearing rollers inside the bearing cup.

Yet another feature of my invention is that the sealed bearing arrangement includes a seal assembly which provides primary and secondary exterior seals for inhibiting entry of foreign material into the interior of the bearing cup.

Other objects and features of the invention will become apparent to those skilled in the art as disclosure is made in the following detailed description of a preferred embodiment of my invention which sets forth the best mode of the invention contemplated by me and which is illustrated in the accompanying sheet of drawing.

DETAILED DESCRIPTION OF THE PREFERRED EMBODIMENT

Figure 1:
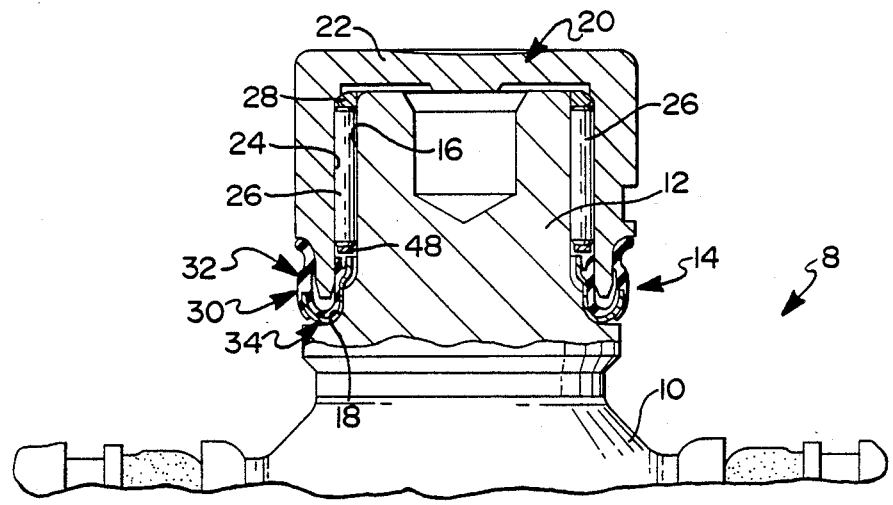
FIG. 1 is a fragmentary view of a Cardan type universal joint which has a sealed bearing arrangement in accordance with my invention.

Referring now to the drawing, a Cardan type of universal joint 8 comprises a pair of bifurcated yoke members (not shown) which are connected by a journal cross member 10. The journal cross member 10 has four orthogonally related trunnions 12 each of which is connected to one arm of one of the bifurcated yoke members (not shown) by a sealed bearing arrangement 14.

The sealed bearing arrangement 14 is mounted in a bore in the arm of the bifurcated yoke member (not shown) and rides on a substantially cylindrical bearing surface 16 of the trunnion 12 which is above a shoulder 18 of enlarged diameter at the base of the trunnion.

The sealed bearing arrangement 14 comprises a bearing cup 20 which is usually sized for a press fit in the yoke member bore and which has an end wall 22 at its closed end. The end wall 22 is designed for engaging an end of the trunnion 12 and thus the bearing cup 20 cooperates with a like bearing cup for the diametrically opposite trunnion to center the associated yoke member with respect to the journal cross member 10. The inside of the bearing cup 20 has a substantially cylindrical bearing surface 24 which is radially spaced from the substantially cylindrical bearing surface 16 of the trunnion 12.

The sealed bearing arrangement 14 further includes a plurality of needle bearing rollers 26 which engage the bearing surfaces 16, 24 of the bearing cup 20 and the trunnion 12 to rotatably support the journal cross member 10 which oscillates with respect to the bifurcated yoke members during operation of the Cardan type universal joint 8. A full complement of needle bearing rollers 26 is commonly used in which case it is also customary to include a thrust washer 28 between the end wall 22 and ends of the needle bearing rollers 26.

The sealed bearing arrangement 14 further comprises a seal assembly 30 which is interposed between the journal cross member 10 and the bearing cup 20 to prevent entry of foreign material into the interior of bearing cup 20 and the loss of lubricant which is inside the bearing cup 20.

The seal assembly 30 comprises an annular elastomeric body 32 of U-shaped cross section which is bonded to a metal washer 34 of U-shaped cross section. The metal washer 34 has an inner ring portion 35 which is press fit on the enlarged diameter shoulder 18 at the base of the trunnion 12. The U-shaped elastomeric body 32 straddles a narrow extension 36 of reduced outer diameter at the lower open end of the bearing cup 20 so that its inner ring portion 37 extends inside the bearing cup 20 while its outer ring portion 38 extends outside the bearing cup 20.

Figure 2:
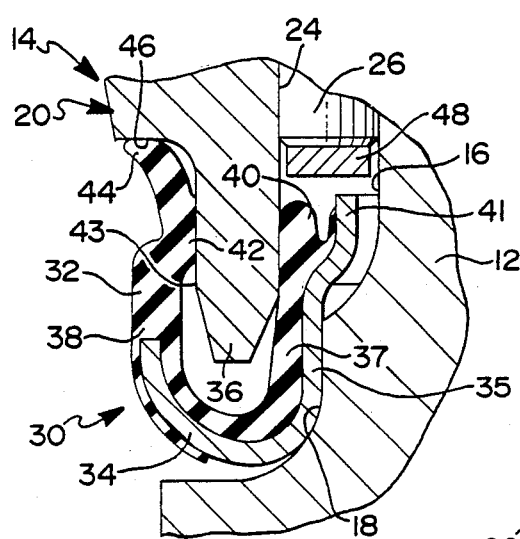
FIG. 2 is an enlarged view of a portion of FIG. 1 showing details of the sealed bearing arrangement in general and of the seal assembly in particular.
Figure 3:
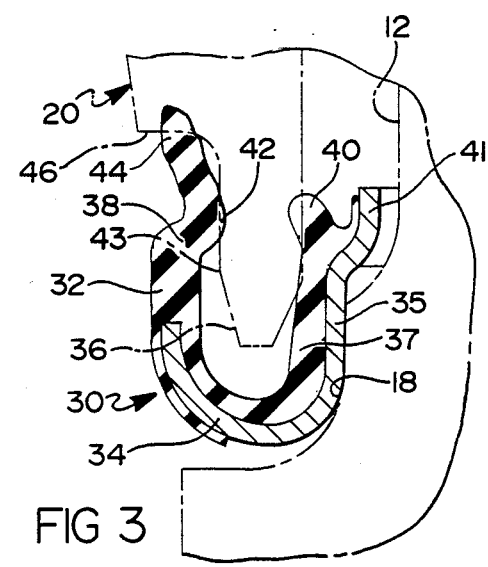
FIG. 3 is an enlarged view similar to FIG. 2 showing details of the seal assembly prior to its incorporation into the sealed bearing arrangement shown in FIGS. 1 and 2.

The inner ring portion 37 has a flexible, annular seal lip 40 at a reduced diameter end portion 41 of the metal inner ring portion 35. The flexible, annular seal lip 40 is conically shaped in its free unstressed state so that it projects radially outwardly toward the end wall 22 of the bearing cup 20 as shown in FIG. 3. In use, the flexible, conically-shaped seal lip 40 is deflected radially inwardly into a self biased sealing engagement with the substantially cylindrical bearing surface 24 inside the bearing cup 20 as shown in FIG. 2. This self biased engagement compensates for substantial seal wear which reduces the outer diameter of the flexible, conically-shaped seal lip 40. Moreover severe operating conditions which build up pressure inside the bearing cup 20 due to heat generation produce a more positive seal because the pressure forces the seal lip 40 into tighter sealing engagement with the bearing surface 24. Consequently the seal lip 40 prevents the loss of lubricant even after substantial seal wear or even during severe operating conditions.

The outer ring portion 38 of the U-shaped elastomeric body 32 provides primary and secondary exterior seals, which in the free unstressed state, are in the form of a flexible annular bead 42 which projects radially inwardly and a second flexible, annular seal lip 44 which is tapered outwardly as shown in FIG. 3. In use, the flexible annular bead 42 is deflected radially outwardly and flattened into a self biased sealing engagement with the reduced outer diameter surface 43 of the narrow extension 36 to provide the primary exterior seal as shown in FIG. 2.

In addition, the flexible, annular seal lip 44 is deflected radially outwardly into a self biased sealing engagement with a radial shoulder 46 of the bearing cup 20 to provide the secondary exterior seal as shown in FIG. 2.

The sealed bearing arrangement further includes a hardened steel washer 48 which is disposed between the ends of the needle bearing rollers 26 and the flexible, annular seal lip 40 to prevent the needle bearing rollers 26 from interfering with the sealing action of the flexible, annular seal lip 40 with the substantially cylindrical bearing surface 24 inside the bearing cup 20. The reduced diameter end portion 41 of the metal inner ring portion 35 which forms part of the seal assembly 30 extends past the flexible, annular seal lip 40 in the axial direction as shown in FIGS. 2 and 3. Thus the inner ring portion 35 is configured to engage the hardened steel washer 48 to hold it away from the flexible, annular seal lip 40 thereby protecting it from operational interference by or damage from the needle bearing rollers 26.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A sealed bearing arrangement for a universal joint having a journal cross member which includes a trunnion having a substantially cylindrical bearing surface comprising;
   a bearing cup having an end wall for engaging an end of the trunnion and a substantially cylindrical bearing surface which is radially spaced from the substantially cylindrical bearing surface of the trunnion,
   a plurality of needle bearing rollers disposed between the bearing surfaces of the bearing cup and the trunnion, and
   a seal assembly interposed between the journal cross member and the bearing cup,
   the seal assembly comprising an annular elastomeric body of U-shaped cross section which is bonded to a metal washer and which has an inner ring portion and an outer ring portion,
   the inner ring portion having a flexible, annular, seal lip which is conically shaped and which projects radially outwardly toward the end wall of the bearing cup into a self biased sealing engagement with the substantially cylindrical bearing surface of the bearing cup, and
   the outer ring portion engaging an outer surface of the bearing cup to provide an exterior seal.

2. The sealed bearing arrangement as defined in claim 1 further including a hardened steel washer which is disposed between ends of the needle bearing rollers and the flexible, annular seal lip of the seal assembly and wherein the metal washer of the seal assembly has an inner ring portion which extends past the flexible, annular seal lip in the axial direction to engage the hardened steel washer and hold it away from the flexible, annular seal lip thereby protecting the flexible, annular seal lip from operational interference by and damage from the needle bearing rollers.

3. The bearing assembly as defined in claim 1 wherein the outer ring portion of the annular elastomeric body has a flexible, annular bead which projects inwardly and a second flexible, annular seal lip which engage outer surfaces of the bearing cup to provide primary and secondary exterior seals.

4. The bearing assembly as defined in claim 2 wherein the outer ring portion of the annular elastomeric body has a flexible, annular bead which projects inwardly and a second flexible, annular seal lip which engage outer surfaces of the bearing cup to provide primary and secondary exterior seals.

5. A sealed bearing arrangement for a universal joint having a journal cross member which includes a trunnion having a substantially cylindrical bearing surface comprising;
   a bearing cup having an end wall for engaging an end of the trunnion and a substantially cylindrical bearing surface which is radially spaced from the substantially cylindrical bearing surface of the trunnion,
   a plurality of needle bearing rollers disposed between the bearing surfaces of the bearing cup and the trunnion, and
   a seal assembly interposed between the journal cross member and the bearing cup,
   the seal assembly comprising an annular elastomeric body of U-shaped cross section which is bonded to a metal washer of U-shaped cross section and which has an inner ring portion and an outer ring portion,
   the inner ring portion having a flexible, annular, seal lip which is conically shaped and which projects radially outwardly toward the end wall of the bearing cup into a self biased sealing engagement with the substantially cylindrical bearing surface of the bearing cup, and
   the outer ring portion having a flexible, annular bead which projects inwardly into a self biased engagement with an outer substantially cylindrical surface of the bearing cup to provide a primary exterior seal and a second flexible, annular seal lip which is tapered and which projects outwardly into a self-biased engagement with an outer shoulder of the bearing cup to provide a secondary exterior seal.

6. The sealed bearing arrangement as defined in claim 1 further including a hardened steel washer which is disposed between ends of the needle bearing rollers and the flexible, annular seal lip of the seal assembly and wherein the metal washer of the seal assembly has an inner ring portion which extends past the flexible, annular seal lip in the axial direction to engage the hardened steel washer and hold it away from the flexible, annular seal lip thereby protecting the flexible, annular seal lip from operational interference by and damage from the needle bearing rollers.

7. A seal assembly for a sealed bearing arrangement for a universal joint having a journal cross member which includes a trunnion having a substantially cylindrical bearing surface which is disposed in a bearing cup having an end wall for engaging an end of the trunnion and a substantially cylindrical bearing surface which is radially spaced from the substantially cylindrical bearing surface of the trunnion, and a plurality of needle bearing rollers disposed between the bearing surfaces of the bearing cup and the trunnion;

the seal assembly being adapted to be interposed between the journal cross member and the bearing cup and comprising:

an annular elastomeric body of U-shaped cross section which is bonded to a metal washer of U-shaped cross section and which has an inner ring portion and an outer ring portion, the inner ring portion having a flexible, annular, seal lip which is conically shaped and which projects radially outwardly toward the end wall of the bearing cup whereby the flexible, annular sealing lip is adapted for a self biased sealing engagement with the substantially cylindrical bearing surface of the bearing cup, and the outer ring portion having a flexible, annular bead which projects inwardly for a self biased engagement with an outer substantially cylindrical surface of the bearing cup to provide a primary exterior seal and a second flexible, annular seal lip which is tapered and which projects outwardly for a self-biased engagement with an outer shoulder of the bearing cup to provide a secondary exterior seal.

8. The seal assembly as defined in claim 7 wherein the metal washer has an inner ring portion which extends past the flexible, annular lip seal in the axial direction to cooperate with a hardened steel washer inside the bearing cup in protecting the flexible, annular lip seal.

* * * * *